United States Patent [19]

Nakazawa et al.

[11] 4,161,897

[45] Jul. 24, 1979

[54] APPARATUS FOR MANUFACTURING A GLASS FIBER CHOPPED STRAND MAT

[75] Inventors: Koji Nakazawa; Toshiaki Kikuchi; Toshihito Fujita, all of Fukushima, Japan

[73] Assignee: Nitto Boseki Co., Ltd., Fukushima, Japan

[21] Appl. No.: 827,272

[22] Filed: Aug. 24, 1977

[30] Foreign Application Priority Data

Aug. 25, 1976 [JP] Japan ................................. 51/101293

[51] Int. Cl.² .......................... D01G 1/04; B26D 5/00
[52] U.S. Cl. ........................................... 83/73; 83/79; 83/109; 83/155; 83/167; 83/358; 83/913
[58] Field of Search ..................... 83/73, 79, 358, 913, 83/155, 167, 109

[56] References Cited

U.S. PATENT DOCUMENTS

| 2,367,278 | 1/1945 | Hewlett | 83/358 X |
| 2,533,550 | 12/1950 | Blackwell | 83/73 X |
| 3,606,115 | 9/1971 | Matsui | 83/73 X |

Primary Examiner—Frank T. Yost
Attorney, Agent, or Firm—Sughrue, Rothwell, Mion, Zinn and Macpeak

[57] ABSTRACT

An apparatus for manufacturing a glass fiber chopped strand mat is disclosed, in which the dropping direction of chopped strands is detected at all times, so that whenever the dropping direction is varied, immediately the relative position of an axis of a feed roller and an axis of a cutter roller with respect to a stationary structure is displaced so as to correct the dropping direction thereby to uniformly accumulate the chopped strands on a conveyer means.

5 Claims, 12 Drawing Figures

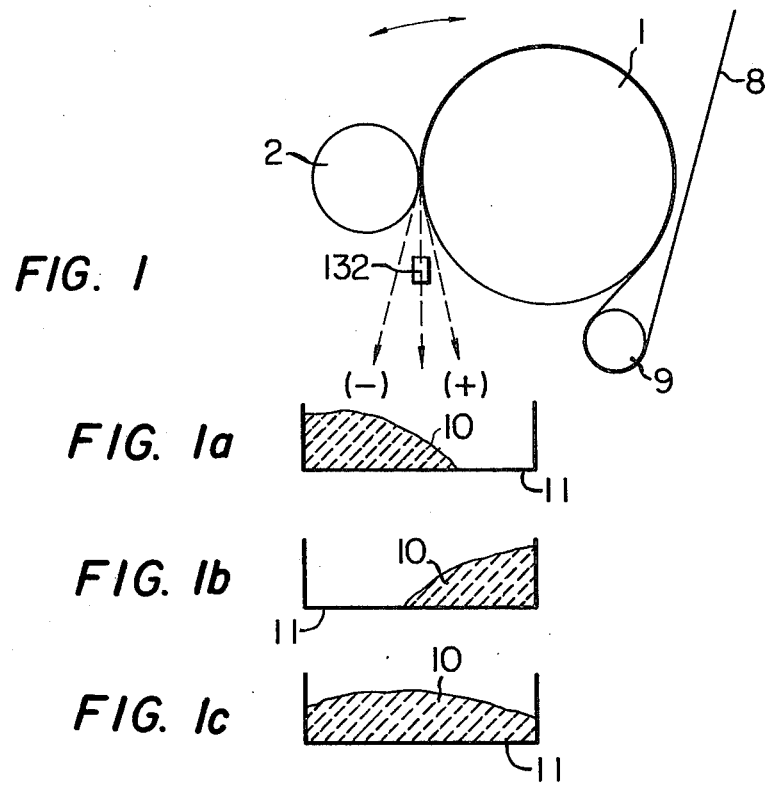
FIG. 1
FIG. 1a
FIG. 1b
FIG. 1c
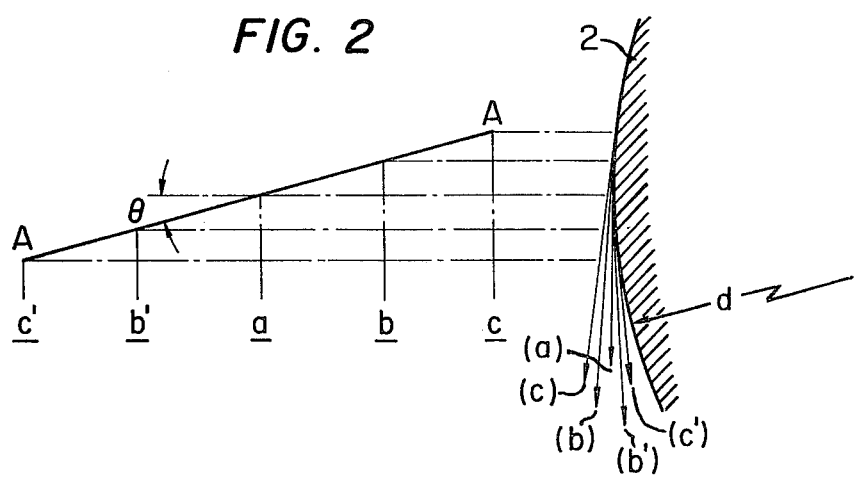
FIG. 2

APPARATUS FOR MANUFACTURING A GLASS FIBER CHOPPED STRAND MAT

BACKGROUND OF THE INVENTION

A method of manufacturing chopped strands in which after glass filaments allowed to flow out of nozzles provided on the bottom of a spinning furnace are coated with coating agent, the glass filaments are collected in the form of a strand, and the glass filaments are allowed to stick onto the surface of a feed roller to be stretched to be fibrous, and then the glass filaments are cut into pieces of a predetermined length by means of a cutter roller abutted against of the feed roller to provide chopped strands, is well known in the art, for instance, by Japanese Patent Publication No. 27089/1975. In this prior art, after glass filaments allowed to flow out of the nozzles provided on the bottom of a spinning furnace are coated with coating agent, the glass filaments are collected in the form of a strand and are allowed to contact the outer surface of a feed roller over its predetermined angle so that the glass filaments are stretched to be fibrous with the aid of a frictional adhesion force due to the contact. In addition, under the condition that the glass filaments in the form of a strand have a contact angle at which the frictional adhesion force is greater than the stretching force, the glass filaments in the form of a strand are cut into pieces of a predetermined length by a cutter roller abutted against the feed roller to thereby provide glass fiber chopped strands.

In the above-described Japanese Patent Publication, with rotation of the cutter roller, the feed roller is rotated at the same circumferential speed so as to conduct both the stretching operation for making the molten glass fibrous and the supplying operation of the strand to the engagement section between the cutter roller and the feed roller possible. Therefore, it is necessary that the strand sticks completely onto the surface of the feed roller with the aid of the frictional force.

Furthermore, there are a great variety of filament diameters, filament numbers, cut lengths, coating agent concentrations, and coating agents. For instance, for filament diameter, the following equation can be established between fibrous degree (A) of glass fiber filament and a fiber forming circumferential speed (B):

$$A = f(B^{\frac{1}{2}})$$

Accordingly, in the case where it is requested to provide a filament of 10μ diameter under the conditions of the filament fibrous degree 13μ and the fiber forming speed 1200 m/min, for example, the manufacture is carried out by keeping other spinning conditions constant and increasing the circumferential velocity of the feed roller to 2000 m/min. In this case, as the circumferential speed of the fiber forming feed roller is equal to that of the cutter roller, the velocity of the cutter roller is also increased. As a result, the dropping direction of chopped strand is determined by a relation between the adhesion force of a chopped strand to the cutter roller, the centrifugal force thereof and the adhesion force thereof to the surface of the feed roller. Increase of the cutting speed results in increase of the adhesion force of the chopped strand toward the cutter roller, that is, the adhesion force of the strand is relatively decreased, and therefore the dropping direction is changed toward the side of the feed roller. In contrast, if the cutting speed is decreased, the dropping direction is changed toward the side of the cutter roller. In addition, according to the variations in the number of filaments, the cutting length, the coating agent concentration and the kind of the coating agent, the adhesion force to the feed roller is varied. Furthermore, as the strand which is wound on and delivered by the surface of the feed roller has been coated with coating agent and is still wet, an excessive coating agent is removed from the strand gradually by a winding tension applied to the strand on the feed roller, and thus the apparent adhesion force of the strand is increased with time. Accordingly, the dropping direction of chopped strand tends to deflect toward the feed roller.

As for the displacement with coating agents, if the viscosity thereof is relatively low, the displacement is effected toward the cutting roller side and if relatively high, the displacement is effected toward the feed roller side.

In the case where a cutter roller having a diameter d and cutting edges A-A embedded therein forming an angle Q with respect to the axis is employed as is shown in FIG. 2 when the strand is moved in the axial direction of a feed roller by means of a traverse device, the cutting position of the cutter roller is changed with respect to the feed roller, as a result of which the dropping direction of chopped strand is also changed.

It is now assumed that the dropping direction of a strand chopped by the middle point a of the cutter roller is as indicated by reference character (a). Since the cutting edge is straight and skewed with respect to the cutting roller, a locus drawn by the tip of each cutting edge of the cutter roller which the latter rotates increases in diameter as it goes to both ends. Therefore, if the cutting point is moved to b from a, the dropping direction is changed from (a) to (b); and if the cutting point is further moved from b to c, then the dropping direction is changed from (b) to (c). In contrast, if the cutting point is moved to b' and then to c', the dropping direction is changed to (b') and then to (c').

Accordingly, whenever the strand being wound on the feed roller is moved in the axial direction, the chopped strand dropping direction is changed. Therefore, cutting of the strand must be carried out by controlling the dropping direction at all times, otherwise, the accumulation of the chopped strands will be one-sided as shown in FIG. 1a or FIG. 1b.

These drawbacks may be overcome by accumulating the chopped strands at a position where the variation in accumulation state of the chopped strands is small, that is, if the distances between the cutting points and the accumulation position are made small. However, in case where a strand is wet with the coating agent and then cut into pieces, if the chopped strands are accumulated at a position near the cutting point, the chopped strands, being struck against the accumulation are scattered, as a result of which the strands are broken and become fluffy, that is, the quality of the strands becomes worse. Accordingly, in the case of the cutting speed of for example, from 1000 to 1500 m/min., the distance between the cutting point and the accumulation area should be more than 1000 mm. As the chopped strand contains water which is 10–20% in weight and coated with a coating agent, the weight of which is 0.16 to 1.5%, with respect to the total weight of the strand, water and the agent respectively, it has been found that it is necessary to dry and cure the chopped strands. However, the accumulation state of the chopped strands piled on the accumulation area affects the drying efficiency thereof greatly. If a usual hot-air dryer is employed to dry the chopped strands and if the chopped strands are piled to form an uneven accumulation, the drying conditions of the chopped strands accumulated on the accumulation area are varied. The chopped strands forming a convexed accumulation, for example, may not be completely dried, while the chopped strands forming a concaved accumulation include excessive amounts of coating agent which may change the hardness of the strands or color the strands. In the case where a high-frequency induction heating type drying system is employed, the absorption of energy is proportional to the strand accumulation configuration. Especially for the concaved accumulation, the absorption energy is approximately zero, and therefore some of the strands will not be dried.

In this view point, too, the uniform delivery of the chopped strand onto the accumulation area is highly desired.

SUMMARY OF THE INVENTION

The present invention is intended to overcome the problem of non-uniform delivery of the chopped strands, even when the revolution speed of the cutting roller and the condition of the coating material of the strand, etc. are changed.

Therefore, an object of the present invention is to provide an apparatus by which the delivery of the chopped strands becomes uniform. Another object of the present invention is to provide an apparatus by which the dropping direction of the chopped strands is maintained as substantially constant irrespective of the revolution speed of the cutting roller and the condition of the coating material on the strands.

These objects are achieved, according to the present invention, by making a relative position between the cutting roller and the feed roller controllable according to a variation of the dropping direction of the chopped strands.

BRIEF DESCRIPTION OF THE DRAWING

FIG. 1 is an explanatory illustration showing dropping directions of chopped strand FIGS. 1(a)-1(c) show various conditions of accumulated chopped strands, which was explained already;

FIG. 2 is an explanatory illustration showing cropping directions of the chopped strands when chopped by various portions of a skewed cutting edge implanted on the peripheral surface of the cutting roller with rotation of the latter, which was explained already;

DETAILED DESCRIPTION OF THE EMBODIMENTS

Figure 3:
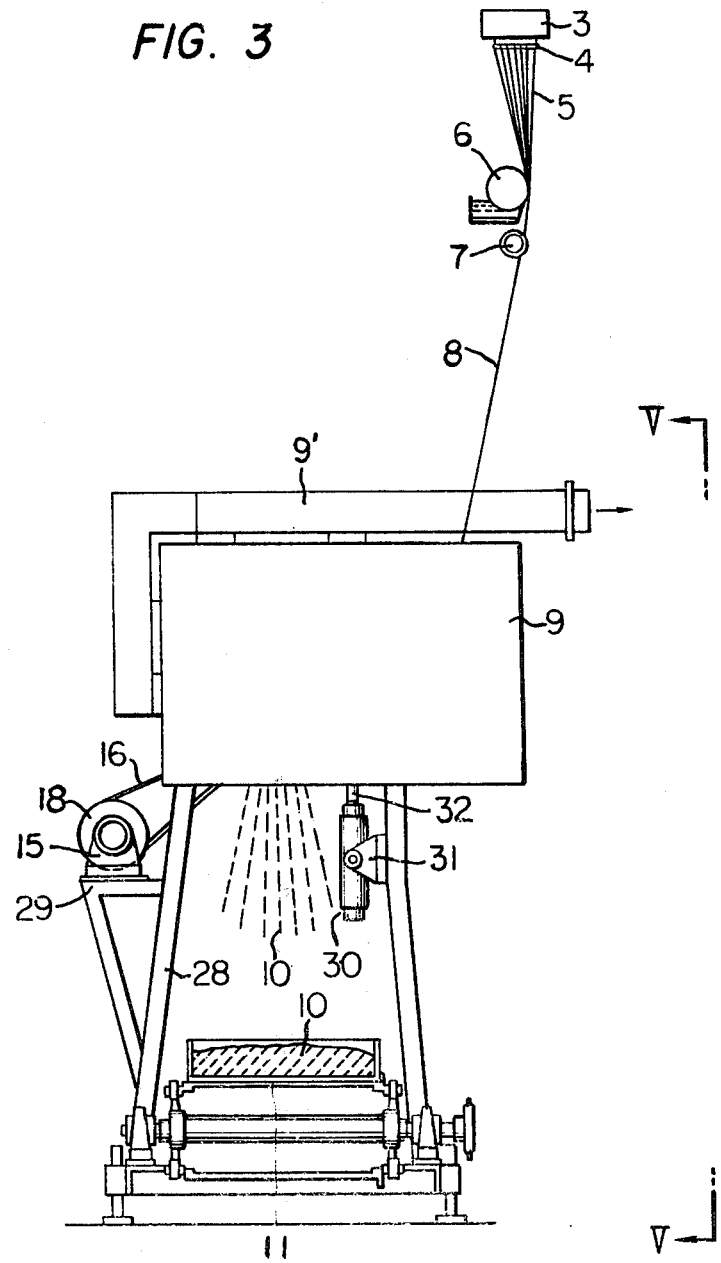
FIG. 3 is a front view of an embodiment of the present invention.

In FIG. 3 which is a front view of an embodiment of the present invention, a melting furnace 3 has a number of nozzle ports 4 at a bottom thereof. Molten glass in the furnace 3 is allowed to flow out through the nozzle ports to form the corresponding number of glass filaments 5. The glass filaments 5 are coated with a coating agent by means of a coating device 6 and then collected into one piece of strand 8 by a collecting roller 7. Then, the strand guided to a cutting box designated by reference numeral 9.

The cutting box 9 is supported by a frame 28 under which a bed 11 is moved along a suitable conveyer system. An exhaust pipe 9' is connected to the cutting box 9 to exhaust volatile materials from the coated strand 8. An electric motor 15 is supported by a support 29 secured to the frame 28. A pulley 18 is mounted on the motor 15, the driving power of which is transmitted through a belt 16 to a driving mechanism disposed behind the cutting box 9. A cylinder 30 having a piston 32 is also supported pivotably by a suitable support 31 secured to the frame 28.

Figure 4:
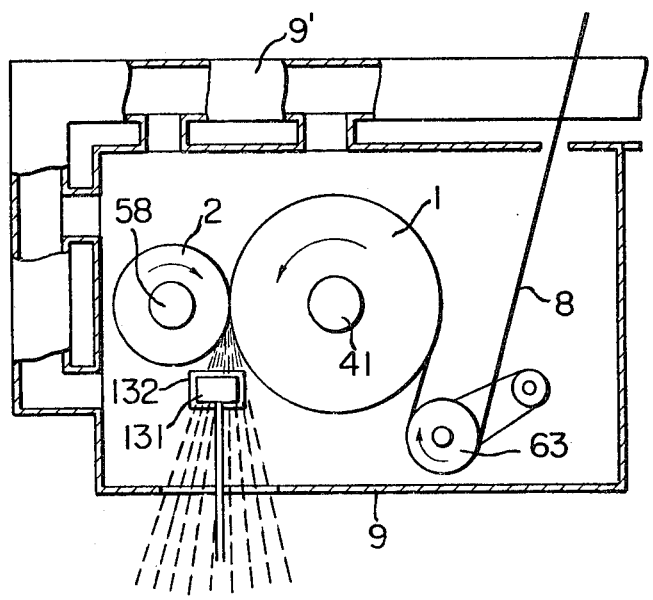
FIG. 4 is a partial cross section of a portion of the embodiment in FIG. 3.

FIG. 4 is a partial cross section of the cutting box 9. In FIG. 4, the strand 8 from the collecting roller 7 passes through a guide roller 63 and is stuck on a surface of a feed roller 1. The feed roller 1 serves also to provide tensions on the filaments 5 to thereby continuously stretch the glass filaments 5 with a light speed rotation thereof. The strand 8 passed over the feed roller 1 is introduced into between the feed roller 1 and the cutting roller 2 which is in pressure contact with the feed roller 1, the pressure being suitably regulated by a cylinder 55 to be described later.

Therefore, the strand is cut by slanted cutting edges embedded in the surface of the cutter roller 2 into chopped strands 10 having a length determined by the number of the cutting edges and the rotational speed of the cutting roller 2.

The chopped strands thus obtained drop on the bed 11 and are accumulated thereon.

The cutter roller 2 is fixedly mounted on one end of a cutter shaft 58.

Figure 5:
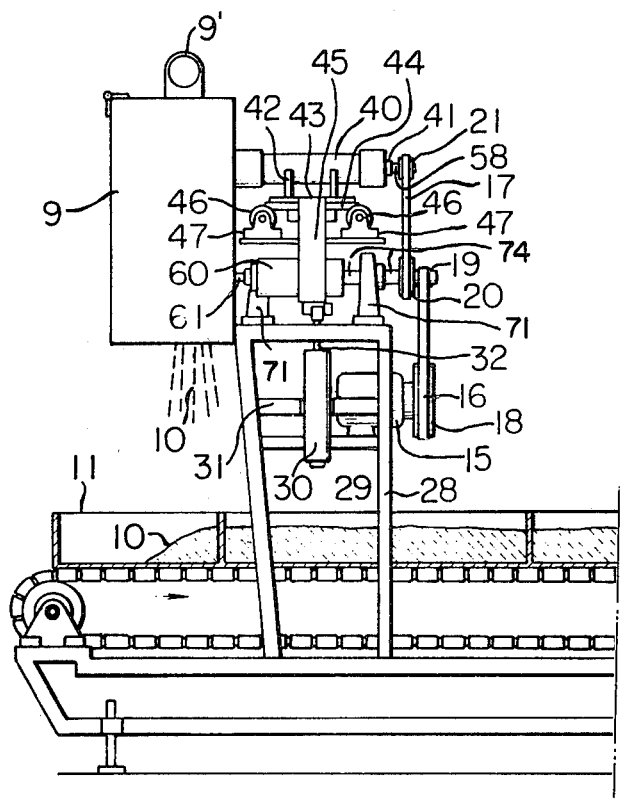
FIG. 5 is a side view of the embodiment in FIG. 3.
Figure 5:
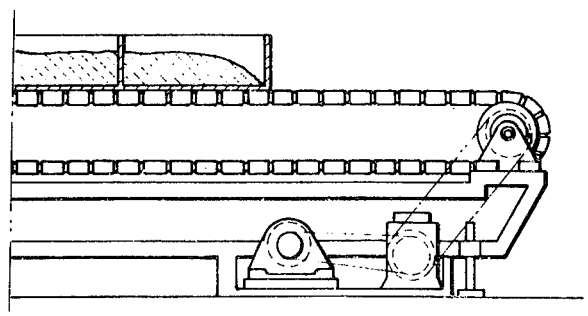
Figure 6:
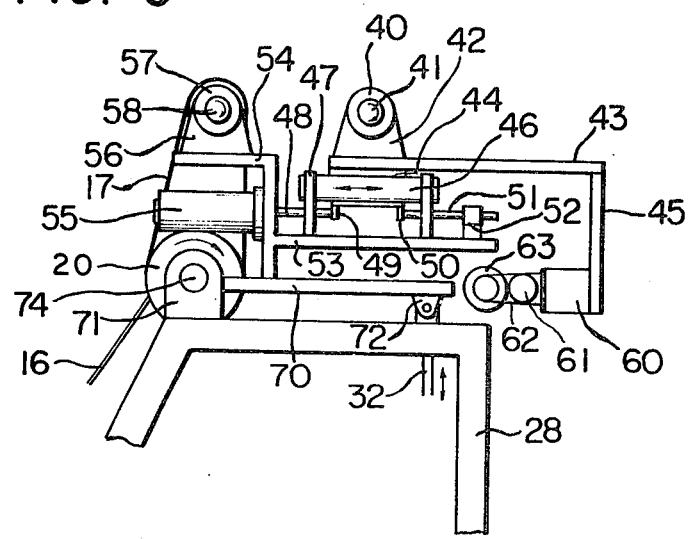
FIG. 6 is a side view of a portion of the embodiment in FIG. 3.
Figure 7:
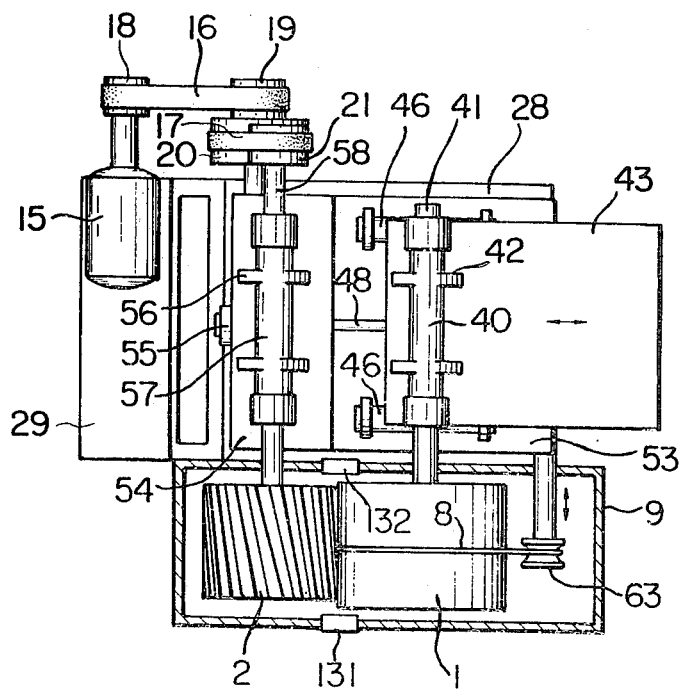
FIG. 7 is a plan view of the portion in FIG. 6.

FIGS. 5, 6 and 7 are a side view of the apparatus taken along a line V—V in FIG. 3, a front view of the driving mechanism of the apparatus and a plane view of the driving mechanism, respectively.

In FIGS. 6 and 7, one side of a base plate 70 is pivotably supported by a shaft 74 which is, in turn, supported rotatably by bearing supports 71. The other side of the base plate 70 is provided with a joint 72 to which the piston 32 of the cylinder 30 is rotatably connected.

A reversed L shape support plate 54 is fixed to the upper surface of the base plate 70. Further, a flat support plate 53 is fixed to one side of a vertical portion of the support plate 54 so that the plate 53 extends in parallel to the base plate 70. The cylinder 55 is mounted fixedly to the opposite side of the vertical portion of the support plate 54 and a piston 48 of the cylinder 55 extends in parallel to the support plate 53.

On the flat support plate 53, a pair of parallel guide rails 46 are provided, on which a slide member 44 is rested. The slide member 44 is formed with a pair of legs 49 and 50. The top of the piston 48 of the cylinder 55 is connected to the leg 49 of the slide member 44 and one of a rod 51 is connected to the other leg 50. The other end of the rod 51 is supported frictionally by a stopper 52 fixedly mounted on the base plate 53. Therefore, the slide member 44 is moved along the rails 46 according to the extension and extraction of the piston 48. On the slide member 44, a plate member 43 is fixed on which a hollow bearing member 40 is fixedly supported by supports 42 fixed to the plate member 43. A shaft 41 having one end mounting the feed roller 1 passes through the hollow bearing 40.

An end portion of an extension of the plate member 43 is bent downwardly to form a vertical plate 45. On the lower end portion of the vertical plate 45, a guide pulley mechanism 60 is fixedly mounted, which comprises the guide pulley 63 mounted on a reciprocative shaft.

On the reversed L shape support structure 54, a hollow bearing 57 is supported by a pair of supports 56 secured to the structure 54. The shaft 58 having one end thereof connected to the cutting roller 2 and the other end formed with a pulley 21 passes through the hollow bearing 57.

A pulley 20 is formed on one end of the shaft 74 and a belt 17 is stretched over the pulleys 20 and 21. A pulley 19 is formed integrally with the pulley 20. Therefore, the torque of the motor 15 is transmitted through the pulleys 18, 19, 20 and 21 and the belts 16 and 17 to the cutter shaft 58 to rotate the cutter roller 2 at a predetermined speed, so that the rotation of the cutter roller 2 is transmitted to the feed roller 1 through the pressure contact therebetween.

The pressure contact between the cutting roller 2 and the feed roller 1 is regulated by regulating the piston 48 of the cylinder 55 to over desirably the slide member 44 along the rails 46, so that the contact pressure of the feed roller 1 against the cutter roller 2 is controlled by the cylinder 55, and the position of the feed roller 1 relative to the cutter roller 2 is fixedly maintained by means of the stopper 52 without undesirable vibration of the feed roller 1.

Immediately below the strand cutting point, there are provided a light emitting device 131 and a light receiving device 132. These devices are, in the embodiment illustrated, mounted on the box 9 as shown in FIG. 4 or 7. The light emitting device 131 is adapted to emit light in parallel with the axial direction of the feed roller 1. The distance between the devices 131 and 132 is substantially equal to the width of the feed roller 1. The purpose of the optical system is to detect the deviation of the dropping direction of the chopped strands from the correct passage thereof and to provide a signal indicative of the direction of devation on which the cylinder 30 is controlled to change the position of the feed roller 1 relative to the cutting roller 2.

Figure 8A:
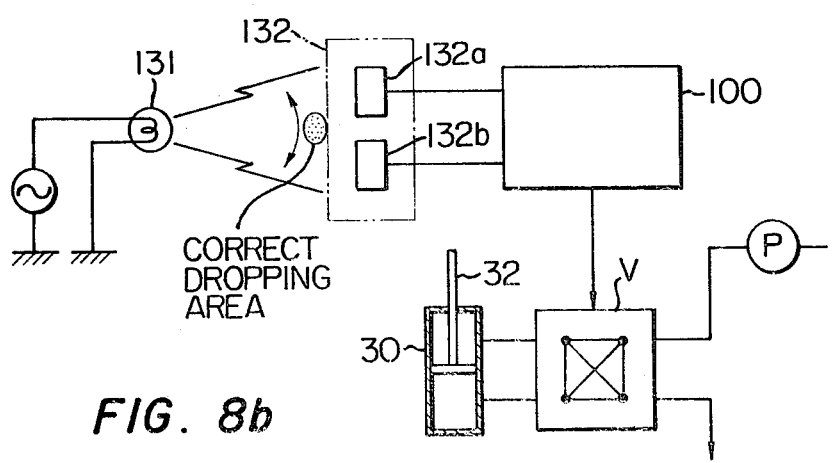
FIG. 8a and 8b is a schematic electric-fluid control system to be used to control a cylinder of the embodiment in FIG. 3.

FIG. 8a shows an example of a control system comprising the optical system, a signal processor 100, an electromagnetic valve V and the cylinder 30, for compensating the variation of the dropping direction of the chopped strands.

Figure 8B:
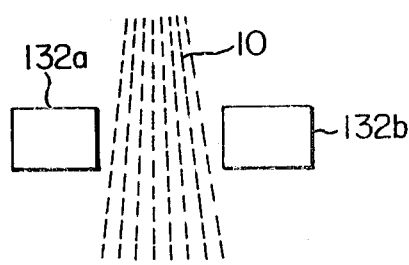

The light receiving device 132 comprises a pair of light receiving elements 132a and 132b disposed in both sides of the correct passage of the chopped strands 10 as shown in FIG. 8b to detect the shift of the passage and to provide a signal indicative of the shift direction.

For example, when the passage is shifted to the left, the light emitted by the light emitting device 131 to the light receiving element 132a is blocked while the element 132b still receives the light. Upon the blocking of the light to the element 132a, the device 132 provide an electric signal which is processed in the control device 100 to send an instruction to the electromagnetic two-way reversible valve V ordering a pressure supply to the cylinder 30 to extend the piston 32 thereof to thereby push-up one end of the base plate 70 until the signal terminates. Accordingly, the position of the feed roller 1 becomes slightly higher than that of the cutting roller 2 and therefore the correct dropping direction is recovered.

In the above description, the variations of the strand dropping direction are detected by the photoelectrical detector. However, it should be understood that the number and the specific arrangement of the optical elements illustrated are mere examples and other arrangements can be utilized. Further, this detection can be carried out by other methods. For instance, when a laser light beam is used, the strand dropping direction can be detected by regarding a blocking of the beam as a normal steady condition by the dropping strand. In another method, two laser beams are emitted in parallel with each other in such a manner that these two laser beams are equally spaced from the strand dropping direction obtained under the normal steady condition, and when one of the laser beams is blocked by the dropping strand, the strand dropping direction is corrected.

Furthermore, in the above description, the strand dropping direction is corrected by displacing the base plate 70 on which the outer roller and feed roller are mounted, by the use of the cylinder 30. However, the same effect can be obtained by other methods. For example it is possible to fix the cutter roller 2 and to regulate the axis of the feed roller 1 with respect to the cutter roller. It may also be possible to fix the feed roller 1 and regulate the axis of the cutter roller 2.

According to the present invention, the dropping direction of the chopped strands is corrected, as described hereinbefore so that the chopped strands are uniformly piled on the bed, to thereby a make a chopped strand mat having uniform thickness possible to be manufactured.

What is claimed is:

1. An apparatus for manufacturing a chopped strand mat having uniform thickness, comprising,
    a frame structure,
    a conveyer means disposed below said frame structure,
    a cutter roller having a plurality of cutting edges embedded on a peripheral surface thereof,
    a first means for rotatably supporting said cutter roller,
    a driving means for rotating said cutter roller,
    a feed roller for feeding a strand to a cutting position,
    a second means having one end pivotably secured to said frame said first means being mounted on said second means,
    a third means mounted on said second means for supporting said feed roller in parallel and in contact with said cutter roller to rotate said feed roller with rotation of said cutter roller,
    a guide means disposed in a stationary position relative to said feed roller for guiding the strand over said feed roller into between said feed roller and said cutter roller, while reciprocating to move the strand axially of said feed roller,
    a detecting means for detecting a deviation of dropping direction of chopped strands from a predetermined direction to provide a control signal indicative of a direction of the deviation,
    a fourth means responsive to said control signal for pivoting said second means to change a relative position of said feed roller to said cutter roller and said frame so that the predetermined dropping direction is recovered.

2. An apparatus claimed in claim 1, wherein said third means comprises a rail means, a slide member mounted on said rail means and a first cylinder means having pistons connected to said slide member, said roller being supported by said slide member.

3. An apparatus claimed in claim 2, wherein said third means further comprises an extension on which said guide means is mounted.

4. An apparatus claimed in claim 1, wherein said detecting means comprises an optical detector operative on either a passing or a blocking of light due to the deviation of the dropping direction of the chopped strands.

5. An apparatus claimed in claim 1, wherein said fourth means comprises a second cylinder pivotably supported by said frame and having a piston, a free end of said piston being pivotably connected to the other end of said second means, and a valve means connected to said second cylinder and supplied with fluid, said valve means being responsive to said control signal to actuate said second cylinder so that said piston of said cylinder is extended when the deviation is in one direction and retracted when the deviation is in the opposite direction.

* * * * *